United States Patent Office 3,149,133
Patented Sept. 15, 1964

3,149,133
(PHENOXARSINYLTHIO)ALIPHATIC ACID COMPOUNDS
Stanley J. Strycker, Midland, Mich., assignor to The Dow Chemical Company, Midland, Mich., a corporation of Delaware
No Drawing. Filed Feb. 4, 1963, Ser. No. 256,100
8 Claims. (Cl. 260—399)

This invention is concerned with novel (10-phenoxarsinylthio) saturated aliphatic carboxylic acids and α-amino carboxylic acids and salts and esters thereof.

This application is a continuation-in-part of a copending application, Serial No. 171,253, filed February 5, 1962, now abandoned.

The novel phenoxarsinylthio compounds of the invention may be represented by the formula:

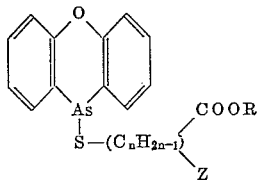

wherein $n$ is an integer from 1 to 10, inclusive, Z represents hydrogen, an amino radical, an acetylamino radical or —COOR, and R represents hydrogen, a lower alkyl radical, an alkali metal or a protonated amine or alkanolamine ion.

A preferred embodiment of the invention consists of the (10-phenoxarsinylthio) saturated aliphatic monocarboxylic and dicarboxylic acids and their salts and esters represented by the formula:

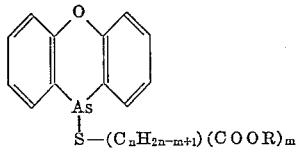

wherein $n$ is an integer from 1 to 10, inclusive, $m$ is 1 or 2, and R has the above-described significance.

Stated in another way, the compounds of the invention are (10-phenoxarsinylthio) saturated aliphatic monocarboxylic acids, α-amino-monocarboxylic acids and dicarboxylic acids and the salts and esters thereof and wherein the aliphatic acid moiety contains from 2 to 12 carbon atoms. Representative aliphatic acids suitable for the latter moiety include acetic, propionic, pentanoic, octanoic, decanoic, dodecanoic, adipic, suberic, azelaic, sebacic, dodecanedioic, α-aminoacetic, α-aminopropionic, α-aminobutyric, α-aminododecanoic and α-amino-3-methyl butyric acids and the like. Suitable salts are the alkali metal, ammonium, lower alkyl amine and lower alkanolamine salts. Preferred amine salts are the lower alkylamine salts and lower alkanolamine salts such as the triethylamine, tributylamine, triethanolamine, diethanolamine, monoisopropanolamine, diethanol-monoisopropanolamine, monopropanolamine and monobutylamine salts and the like. The terms "lower alkyl" and "lower alkanol," as employed herein, refer to moieties containing from 1 to 4 carbon atoms. The new compounds are oily liquids or crystalline solids somewhat soluble in organic solvents, such as ethanol, acetone and benzene, and of relatively low solubility in water, except for the salts of the carboxylic acid compounds, the latter salts being relatively water-soluble, particularly in hot water.

The novel compounds can be prepared by heating a mixture of 10,10′-oxybisphenoxarsine and a mercapto compound of the formula

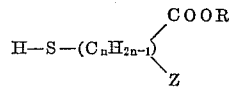

wherein Z and R have the aforementioned significance. The mixing and heating are preferably carried out in an inert solvent or suspending medium such as water or benzene. The reaction is initiated readily when the oxybisphenoxarsine in finely divided form is contacted with the mercapto compound at somewhat elevated temperatures. Conveniently, the reaction is carried out at the boiling point of the solvent or suspending medium and under reflux. For efficient production of the desired product, it is advantageous to employ at least 2 moles of the mercapto compound per mole of oxybisphenoxarsine in the reaction. On completion of the reaction, the desired compounds can be isolated and purified by conventional procedures such as by distilling off solvents, by filtration and by crystallization of solid products. In the preparation of amine salts of the acids of the invention, it is convenient to add the corresponding amine to a mixture of oxybisphenoxarsine and mercapto-aliphatic acid at the time of initiating the reaction. Similarly, where an alkali metal salt is desired, the corresponding metal ion can be introduced in the form of an alkali metal bicarbonate mixed with the initial reactants when the mercapto compound is employed in the free acid form. Alternatively, the alkali metal salt of the mercapto compound may be employed as a starting material.

The new compounds display a wide spectrum of parasiticidal and pesticidal activity and have been found to be particularly effective for the control of aquatic weeds. Many of the compounds have also been found effective as herbicides for terrestrial plants, particularly on broad leaf species. Although the compounds are not completely equivalent in the control of all species, they are effective for the control of many species of animal pests, such as tapeworm, ascarids, ticks, mites and insect larvae, as well as of plant pests such as wild oats and millet. The compounds have also proved effective against bacteria and fungi and can be employed for the preservation of wood against the attack of microorganisms in the soil.

The following examples illustrate the invention but are not to be construed as limiting the same. Parts and percentages are by weight unless otherwise indicated.

*Example 1*

25.1 grams (0.05 mole) of 10,10′-oxybisphenoxarsine and 12 grams (0.13 mole) of 95 percent mercaptoacetic acid were dispersed together in 500 milliliters of water to form a slurry. To the latter slurry, 9.2 grams (0.11 mole) of sodium bicarbonate was added and the resultant mixture stirred and heated to boiling under reflux. The heating and stirring were continued for a period of about 40 minutes and until completion of the reaction as evidenced by the fact that the reaction mixture became a clear and colorless solution. The crude reaction mixture was thereupon filtered while hot and the filtrate collected and cooled in an ice bath to produce a gel-like product consisting of a sodium salt product of (10-phenoxarsinylthio)- acetic acid. The cooled filtrate was acidified carefully with dilute sulfuric acid to precipitate the (10-phenoxarsinylthio)acetic acid product as a white, fluffy solid. The latter was crystallized from aqueous ethanol to obtain a purified product which crystallized in the form of the hemihydrate of (10-phenoxarsinylthio)acetic acid, having a melting range of from 109° to 114° C. On analysis, the product was found to contain 49.03 percent of carbon, 3.32 percent of hydrogen and 21.75 percent of arsenic, as compared to theoretical values of 48.99 percent carbon, 3.52 percent hydrogen and 21.83 percent arsenic, calculated for the hemihydrate of (10-phenoxarsinylthio)acetic acid.

Example 2

A mixture of 25.1 grams (0.05 mole) of 10,10'-oxybisphenoxarsine, 12.7 grams (0.12 mole) of 3-mercaptopropionic acid and 15 grams (0.1 mole) of triethanolamine were dispersed together in 300 milliliters of water to form a slurry. The latter was heated under reflux for a period of one hour and the resulting clear, colorless solution was thereafter cooled to room temperature and placed in an ice bath. On cooling, the desired product separated as a light tan, fluffy solid which was crystallized from isopropanol to produce a purified product in the form of pale yellow, fluffy crystalline plates having a melting point of 126°–127° C. This (10-phenoxarsinylthio) propionic acid-triethanolamine salt hemihydrate product contained 49.68 percent of carbon, 5.47 percent of hydrogen and 15.35 percent of arsenic by analysis, as compared to theoretical values of 49.8 percent carbon, 5.77 percent hydrogen and 14.79 percent arsenic, calculated for said product.

Example 3

A mixture of 25.1 grams (0.05 mole) of 10,10'-oxybisphenoxarsine and 12 grams (0.13 mole) of 95 percent mercaptoacetic acid in 500 milliliters of benzene was heated at the boiling point of the mixture with stirring for a period of about 4 hours. During the heating period, water of reaction and benzene distilled from the mixture azeotropically and were condensed and separated with the benzene being returned to the reaction mixture. On completion of the reaction, the benzene was removed by distillation under vacuum, leaving the desired product as a residue in the form of a clear, viscous oil. This oil crystallized slowly on standing. The resulting crystals were recrystallized from aqueous ethanol to give a (10-phenoxarsinylthio)acetic acid product substantially identical to the product of Example 1.

Example 4

25.1 grams of 10,10'-oxybisphenoxarsine, 10.6 grams (0.11 mole) of 95 percent mercaptoacetic acid and 11.1 grams (0.11 mole) of triethylamine were dispersed in 300 milliliters of water and heated as in Example 2 for a period of two hours. During the heating period, the reaction mixture formed a clear solution. On completion of the reaction, the reaction mixture was heated under vacuum to remove water and unreacted triethylamine and to leave the desired triethylamine salt of (10-phenoxarsinylthio)acetic acid as a residue in the form of a clear, brown, mobile liquid having a refractive index $n/D$ of 1.5683 at 25° C.

Example 5

Following the procedure of Example 3, a solution of 13.2 grams (0.11 mole) of ethyl thiogylcolate and 25.1 grams (0.05 mole) of 10,10'-oxybisphenoxarsine in 300 milliliters of benzene was heated at reflux temperature for a period of 4 hours. The clear, yellow reaction product solution was cooled and the solvent removed under vacuum to obtain, as a residue, the ethyl ester of (10-phenoxarsinylthio)acetic acid in the form of a clear, pale yellow oil readily soluble in acetone, alcohol and xylene and substantially insoluble in water.

Example 6

25.1 grams of 10,10'-oxybisphenoxarsine and 18 grams (0.12 mole) of 2-mercaptosuccinic acid were dispersed in 250 milliliters of water and the resulting mixture heated at the boiling point and under reflux for a period of 1 hour. During the heating period, the original dispersion changed to a thick, gelatinous composition. This crude product was filtered and the recovered mass crystallized from ethanol to obtain a 2-(10-phenoxarsinylthio)succinic acid product in the form of fine, white needles melting at 205°–207° C. This product contained 49.16 percent carbon, 3.29 percent hydrogen and 8.30 percent sulfur by analysis, compared to the corresponding theoretical percentages of 48.99, 3.34 and 8.18, respectively, calculated for 2-(10-phenoxarsinylthio)succinic acid. The latter is relatively insoluble in water, somewhat soluble in ethanol and readily soluble in acetone. In the form of the sodium salt thereof, this product dissolves readily in aqueous one percent sodium hydroxide solution.

Example 7

Equimolar proportions of sodium hydrosulfide and sodium 4-bromobutyrate are reacted in aqueous solution to produce a solution of sodium 4-mercaptobutyrate. To such a solution, containing 7.1 parts of the sodium 4-mercaptobutyrate, is added 12.6 parts of 10,10'-oxybisphenoxarsine and the resulting slurry is heated under reflux as in Example 2. On completion of the reaction, as evidenced by the formation of a clear, homogeneous solution, the crude reaction product is cooled and concentrated under vacuum to crystallize the sodium 4-(10-phenoxarsinylthio) butyrate product as an off-white, powdery solid. This product contains water of hydration and, after recrystallization from 95 percent ethanol, melts at 200° C.

Example 8

An aqueous solution of sodium 11-mercaptoundecanoate is reacted with 10,10'-oxybisphenoxarsine in the proportion of 2 moles of the mercapto compound per mole of the oxybisphenoxarsine. The crude reaction product is worked up as in Example 1 to obtain an 11-(10-phenoxarsinylthio) undecanoic acid as a white, crystalline solid melting at 93°–94° C.

Example 9

12.6 grams (0.025 mole) of 10,10'-oxybisphenoxarsine and 9.6 grams (0.05 mole) of N-acetylpenicillamine (N-acetyl-3-mercaptovaline) were slurried together in 300 milliliters of benzene and the resulting mixture heated at the boiling point thereof with stirring. During the heating period, water of reaction distilled from the mixture azeotropically with the benzene and was condensed and separated with the benzene being returned to the reaction mixture. On completion of the reaction, as evidenced by the distillation of the theoretical amount of water of reaction, benzene was removed from the reaction vessel by distillation under vacuum to obtain the crude product as a grey, solid residue. The latter was recrystallized from ethanol to obtain the desired N-acetyl-3(10-phenoxarsinylthio)valine product in the form of fine, white, needle-like crystals. This product had a melting point of 200° C.

Example 10

11 grams (0.022 mole) of 10,10'-oxybisphenoxarsine was slurried in 110 milliliters of benzene and 10.15 grams (0.05 mole) of the ethyl ester of cysteine hydrochloride was added thereto portionwise with agitation at room temperature. During the addition of the cysteine ester, the reaction mixture became an almost clear solution and thereafter a heavy, white precipitate of the product formed. The resulting thick slurry was maintained at room temperature for 30 minutes and thereafter separated by filtration and dried. The precipitated product was dissolved in 160 milliliters of ethanol and the resulting solution was poured into 900 milliliters of ether at room temperature to reprecipitate the product. The latter was recovered by filtration and dried. The crystalline product, 3-(10-phenoxarsinylthio)alanine, ethyl ester, hydrochloride, had a melting point of 142°–145° C. and was found to have an infrared spectrum in agreement with the assigned structure. This product was only slightly soluble in benzene but was readily soluble in acetone and water.

In a similar fashion, 2 molar proportions of the sodium salt of homocysteine (2-amino-4-mercapto-butyric acid) are reacted with 1 molar proportion of the 10,10'-oxybisphenoxarsine by the method of Example 2 to produce 2-amino-4-(10-phenoxarsinylthio)-butyric acid, sodium salt, having a molecular weight of about 399. Similarly, 2-amino-12-mercapto-dodecanoic acid is heated with oxybisphenoxarsine in the proportions of 2 moles of the former to 1 mole of the latter to produce 2-amino-12-(10-phenoxarsinylthio)-dodecanoic acid as a crystalline solid, substantially insoluble in water and having a molecular weight of about 511. It will be apparent that those of the compounds of the invention having a free amino group in the molecule may be prepared and employed in the form of their mineral acid salts such as the hydrochloride or the like.

The mercapto(amino acids) employed in the preparation of the compounds of the invention are available as natural products or may be synthesized by known procedures. Thus, for example, 10-undecenal-1

$$(CH_2=CH(CH_2)_8-CHO)$$

is heated with sodium cyanide and sodium carbonate to produce 5(9-decenyl) hydantoin as a pale yellow, waxy solid melting at 130°–131° C. The latter is reacted with thioacetic acid ($CH_3COSH$) to produce 5(10-acetyl mercaptodecyl) hydantoin and the latter is hydrolyzed to the desired 2-amino-12-mercapto-dodecanoic acid.

In representative operations, 2-(10-phenoxarsinylthio) acetic acid, N-acetyl-3(10-phenoxarsinylthio)-valine and 2-(10-phenoxarsinylthio)succinic acid were individually dispersed in water with the aid of wetting and dispersing agents to prepare compositions containing 100 parts by weight of one of said acid compounds per million parts of dispersion. The foliage of cranberry bean plants having the first two true leaves fully expanded were immersed in the compositions, allowed to dry and infested with 5 southern army worm larvae to each plant. The plants were then maintained under good growing conditions in a greenhouse and observed after 72 hours. Complete kill of the army worms was obtained on the plants treated with each of the (10-phenoxarsinylthio) acid compounds.

In further representative determinations, each of the compounds of Examples 1, 2, 4, 5 and 6 was dispersed in a separate container in which aquatic weeds such as Elodea species, moneywort and coontail were growing. Complete kill of the weeds was obtained with each of the compounds at a concentration of 10 parts by weight per million parts of water.

I claim:
1. A phenoxarsinylthio compound having the formula:

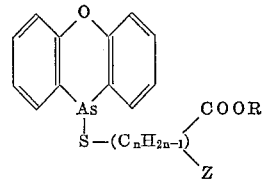

wherein $n$ is an integer from 1 to 10, inclusive, Z represents a substituent selected from the group consisting of hydrogen, unsubstituted amino, acetylamino and

—COOR and R represents a substituent selected from the group consisting of hydrogen, lower alkyl, ammonium, lower alkyl ammonium and lower alkanol ammonium.
2. (10-phenoxarsinylthio) acetic acid.
3. The triethanolamine salt of 3-(10-phenoxarsinylthio) propionic acid.
4. Ethyl (10-phenoxarsinylthio) acetate.
5. 2-(10-phenoxarsinylthio) succinic acid.
6. N-acetyl-3(10-phenoxarsinylthio)-valine.
7. 11-(10-phenoxarsinylthio) undecanoic acid.
8. 3(10-phenoxarsinylthio)-alanine, ethyl ester hydrochloride.

No references cited.